US012172807B2

(12) United States Patent
Bisio

(10) Patent No.: US 12,172,807 B2
(45) Date of Patent: Dec. 24, 2024

(54) VIAL FOR FLUID PRODUCTS WITH CHILDPROOF SYSTEM

(71) Applicant: BISIO PROGETTI S.P.A., Alessandria (IT)

(72) Inventor: Luigi Bisio, Alessandria (IT)

(73) Assignee: BISIO PROGETTI S.P.A., Alessandria (IT)

(*) Notice: Subject to any disclaimer, the term of this patent is extended or adjusted under 35 U.S.C. 154(b) by 72 days.

(21) Appl. No.: 17/925,194

(22) PCT Filed: May 3, 2021

(86) PCT No.: PCT/IB2021/053673
§ 371 (c)(1),
(2) Date: Nov. 14, 2022

(87) PCT Pub. No.: WO2021/250475
PCT Pub. Date: Dec. 16, 2021

(65) Prior Publication Data
US 2023/0192367 A1 Jun. 22, 2023

(30) Foreign Application Priority Data
Jun. 11, 2020 (IT) ........................ 102020000014023

(51) Int. Cl.
*B65D 50/04* (2006.01)
*A61J 1/06* (2006.01)
(Continued)

(52) U.S. Cl.
CPC ............... *B65D 50/04* (2013.01); *B65D 1/09* (2013.01); *B65D 41/32* (2013.01); *A61J 1/067* (2013.01);
(Continued)

(58) Field of Classification Search
CPC .......... B65D 1/09; B65D 41/32; B65D 41/34; B65D 50/04; B65D 50/041; B65D 50/061;
(Continued)

(56) References Cited

U.S. PATENT DOCUMENTS 4,134,511 A * 1/1979 Deussen ................ B65D 51/20 215/48
4,157,765 A * 6/1979 Golebiewsky ....... B65D 51/222 222/81
(Continued)

FOREIGN PATENT DOCUMENTS

WO 2013008068 A1 1/2013
WO 2015136563 A1 9/2015

OTHER PUBLICATIONS

International Search Report, issued in PCT/IB2021/053673, mailed Jun. 15, 2021, Rijswijk, NL.

*Primary Examiner* — Gideon R Weinerth
(74) *Attorney, Agent, or Firm* — ArentFox Schiff LLP; Michael Fainberg

(57) ABSTRACT

A vial for fluid products, particularly pharmaceutical, cosmetic, and medical products has a containment body closed by a closing element removable along a predetermined breaking line, and an opening key slidingly fitted onto the closing element and prismatically rotationally engageable with the closing element to remove the closing element from the containment body. The opening key is prismatically engageable with the closing element by inserting prismatic protrusions of the closing element into special recesses of the opening key.

11 Claims, 7 Drawing Sheets

(51) Int. Cl.

| | |
|---|---|
| ***B65D 1/09*** | (2006.01) |
| ***B65D 35/00*** | (2006.01) |
| ***B65D 41/32*** | (2006.01) |
| ***B65D 50/00*** | (2006.01) |
| ***B65D 51/18*** | (2006.01) |
| *B65D 1/02* | (2006.01) |

(52) U.S. Cl.
CPC ........ *B65D 1/0238* (2013.01); *B65D 2221/00* (2013.01); *B65D 2501/0054* (2013.01)

(58) Field of Classification Search
CPC ............ B65D 2501/0054; B65D 1/095; B65D 1/0238; B65D 35/44; B65D 55/024; B65D 2215/02; B65D 2221/00; A61J 1/067
USPC ...... 206/530, 820, 343, 532; 215/14–30, 47, 215/48, 901, 256, 250, 253, 201; 220/23.4, 258.5, 274; 222/147, 541.8, 222/153.06
See application file for complete search history.

(56) References Cited

U.S. PATENT DOCUMENTS

| | | | | | |
|---|---|---|---|---|---|
| 4,512,475 | A * | 4/1985 | Federighi | B65D 1/095 | 222/541.9 |
| 4,527,700 | A * | 7/1985 | Jupin | B65D 51/222 | 215/322 |
| 4,666,063 | A * | 5/1987 | Holoubek | B65D 51/228 | 524/427 |
| 4,688,703 | A * | 8/1987 | Bayer | B65D 51/228 | 215/901 |
| 4,773,548 | A * | 9/1988 | Deussen | B65D 51/20 | 215/901 |
| 4,790,453 | A * | 12/1988 | Fontana | B65D 1/095 | 222/129 |
| 4,951,822 | A * | 8/1990 | Fontana | B65D 1/095 | 206/820 |
| 5,158,192 | A * | 10/1992 | Lataix | B65B 3/022 | 215/256 |
| 5,228,593 | A * | 7/1993 | O'Meara | B65D 51/225 | 215/253 |
| 5,255,804 | A * | 10/1993 | Butterbrodt | B65D 1/0238 | 215/901 |
| 5,425,920 | A * | 6/1995 | Conti | B01L 3/569 | 422/537 |
| 5,586,672 | A * | 12/1996 | Schneider | B65D 35/12 | 222/541.6 |
| 5,762,215 | A * | 6/1998 | Ogden | B65D 50/041 | 215/217 |
| 5,769,252 | A * | 6/1998 | Volpe | B65D 50/068 | 215/256 |
| 6,206,216 | B1 * | 3/2001 | Stalions | B65D 50/041 | 215/220 |
| 6,234,333 | B1 * | 5/2001 | Federighi | B65D 1/0238 | 222/541.9 |
| 6,443,330 | B1 * | 9/2002 | Kuboshima | B65D 1/0238 | 222/541.9 |
| 7,188,750 | B2 * | 3/2007 | Vogel | A61J 1/18 | 222/153.07 |
| 7,540,389 | B2 * | 6/2009 | Fontana | B65D 1/095 | 215/47 |
| 8,622,245 | B2 * | 1/2014 | Zakrzewski | B65D 35/22 | 222/94 |
| 8,833,576 | B2 * | 9/2014 | Fontana | B65D 1/0246 | 222/541.6 |
| 9,126,728 | B1 * | 9/2015 | Elston | B65D 50/067 | |
| 9,586,738 | B2 * | 3/2017 | Herrbach | B65D 50/041 | |
| 10,414,561 | B1 * | 9/2019 | Moghaddam | B65D 50/041 | |
| 10,633,151 | B2 * | 4/2020 | Philip | B65D 50/041 | |
| 10,813,432 | B1 * | 10/2020 | Zhang | A45D 40/06 | |
| 11,745,920 | B2 * | 9/2023 | Tani | A45D 40/26 | 220/266 |
| 12,006,110 | B2 * | 6/2024 | Bois | B65D 51/244 | |
| 2003/0034322 | A1 * | 2/2003 | Doherty | B65D 41/0485 | 215/277 |
| 2003/0155356 | A1 * | 8/2003 | Fontana | B65D 1/095 | 220/276 |
| 2005/0045579 | A1 | 3/2005 | Weiler et al. | | |
| 2006/0151417 | A1 * | 7/2006 | Fuchs | B65D 35/44 | 215/256 |
| 2009/0321382 | A1 * | 12/2009 | Fontana | B65D 50/045 | 215/329 |
| 2010/0126990 | A1 * | 5/2010 | Fontana | B65D 41/3495 | 215/44 |
| 2011/0132928 | A1 * | 6/2011 | Fontana | A61J 1/1425 | 222/129 |
| 2015/0175324 | A1 * | 6/2015 | Tada | B65D 50/041 | 215/220 |
| 2022/0387256 | A1 * | 12/2022 | Byron | B65B 3/003 | |
| 2023/0192367 | A1 * | 6/2023 | Bisio | B65D 50/04 | 220/23.4 |
| 2023/0415966 | A1 * | 12/2023 | Rossi | B65D 1/0238 | |
| 2024/0002107 | A1 * | 1/2024 | Bisio | B65D 39/16 | |

* cited by examiner

VIAL FOR FLUID PRODUCTS WITH CHILDPROOF SYSTEM

CROSS-REFERENCE TO RELATED APPLICATIONS

This application is a National Phase Application of PCT International Application No. PCT/IB2021/053673, having an International Filing Date of May 3, 2021 which claims priority to Italian Application No. 102020000014023 filed Jun. 11, 2020, each of which is hereby incorporated by reference in its entirety.

FIELD OF THE INVENTION

The present invention relates to a vial for fluid products, particularly for medical, pharmaceutical, cosmetic, food products or the like, provided with a protection system against accidental opening which makes it "childproof".

BACKGROUND OF THE INVENTION

With particular reference to the pharmaceutical and/or cosmetic industries, the use of vials made of polymer material for packaging one or more doses of fluid, liquid or pasty products is known.

With particular reference to disposable vials, said vials comprise a containment body of a predetermined dose of product, provided with a neck at the top of which a product dispensing mouth is defined, closed by closing means which are removable by the user at the time of use.

Generally, in disposable vials, the closing means is made in a single piece with the containment body during molding operation and connected thereto by a predetermined breaking zone. In other words, the containment body and the closing means are made in a single monolithic piece so that the dispensing mouth of the vial is initially closed and can be opened by tearing the closing means off from the containment body.

In order to allow gripping and removal of the closing means, the latter is provided with a gripping key of various shapes, which allows it to rotate thereon with respect to the containment body so as to tear the predetermined breaking zone.

However, the known vials have some drawbacks.

It should be noted that in the absence of a medical prescription, assuming certain products contained in the vials (for example medicinal or pharmaceutical products) can be dangerous and therefore the need has arisen to devise vials provided with childproof anti-tampering means. In fact, it is apparent that even a child, after a few attempts, manages to tear off the closing means by acting on the gripping key to access the contents.

Furthermore, known types of vials do not always ensure integrity and sterility of the product packaged therein. When traditional vials are handled or placed in cases (drawers, cabinets, cosmetic bags, etc.), the gripping key may be subjected to accidental and involuntary impacts, such as to tear the predetermined breaking zone before actual use of the fluid product.

SUMMARY OF THE INVENTION

It is the object of the present invention to provide a vial for fluid products, particularly for medical, pharmaceutical, cosmetic, food products or the like, which is childproof.

It is also the object of the present invention to provide a vial which allows to overcome the drawbacks of the known vials in a simple and rational manner, being easy and effective to use and at a low cost.

Such an object is achieved by a vial for fluid products provided with a protection system against accidental opening and by a strip of vials as described and claimed herein. Other embodiments of the vial according to the present invention are also described.

BRIEF DESCRIPTION OF THE FIGURES

The features and advantages of the vial according to the present invention will become apparent from the following description, given by way of non-limiting example in accordance with the accompanying drawings, in which:

FIG. 2A shows the vial closing element made in one piece with the containment body, and FIG. 2B shows the vial opening lever, made as a separate component from the containment body;

DETAILED DESCRIPTION

Figure 1:
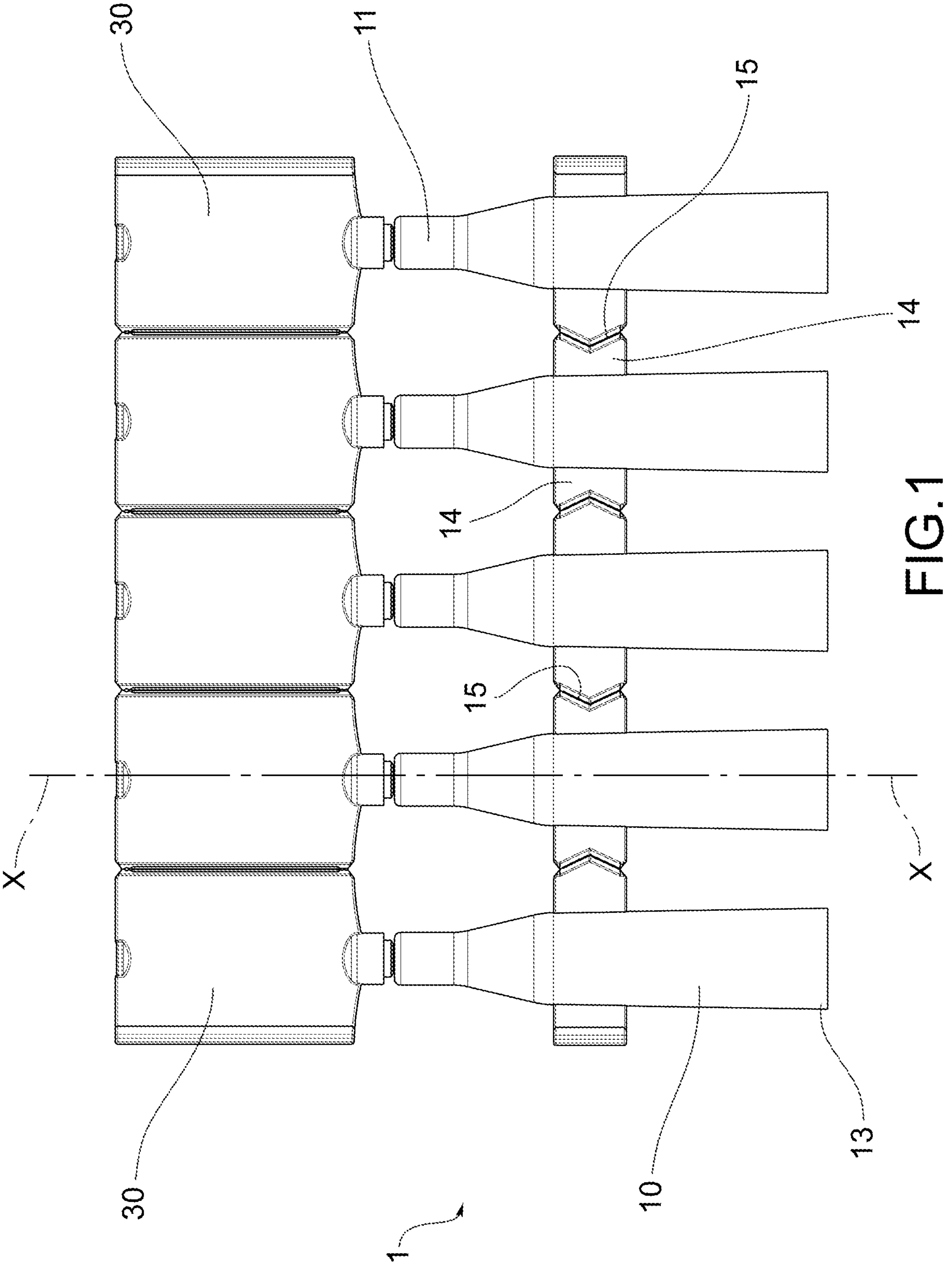
FIG. 1 shows a front view of a series of vials in accordance with the present invention, in a constructional variant.
Figure 2B:
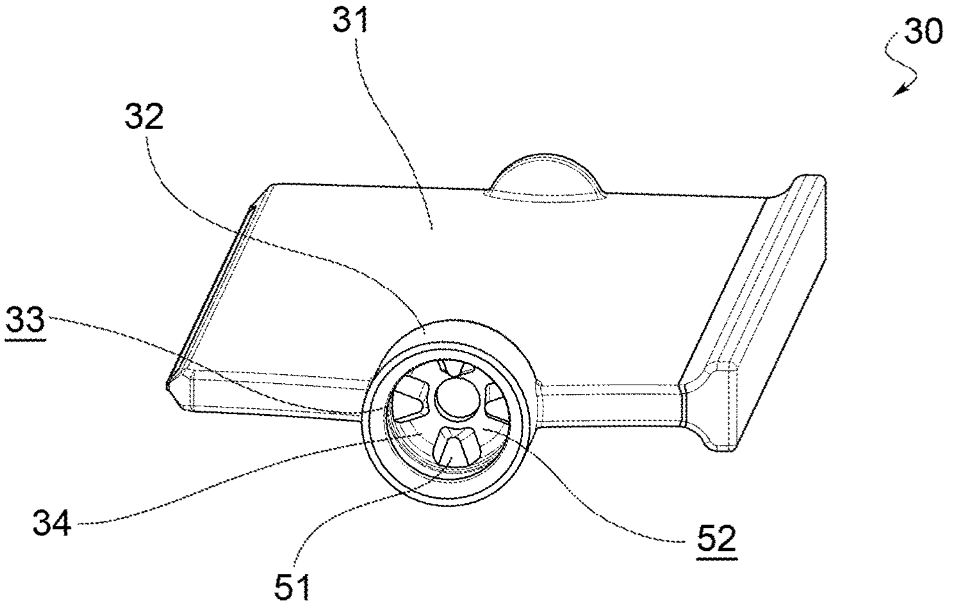
FIGS. 2A and 2B show an axonometric view of one of the vials in FIG. 1; in particular.
Figure 2A:
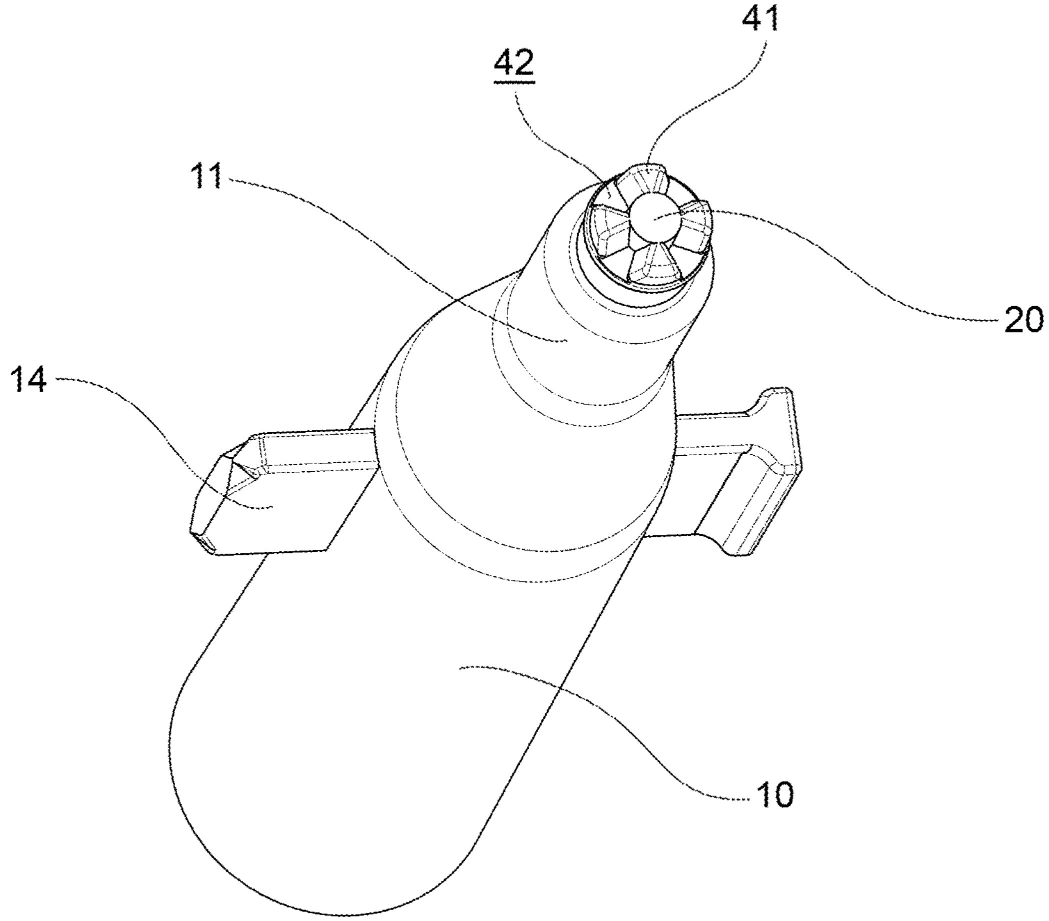
Figure 3B:
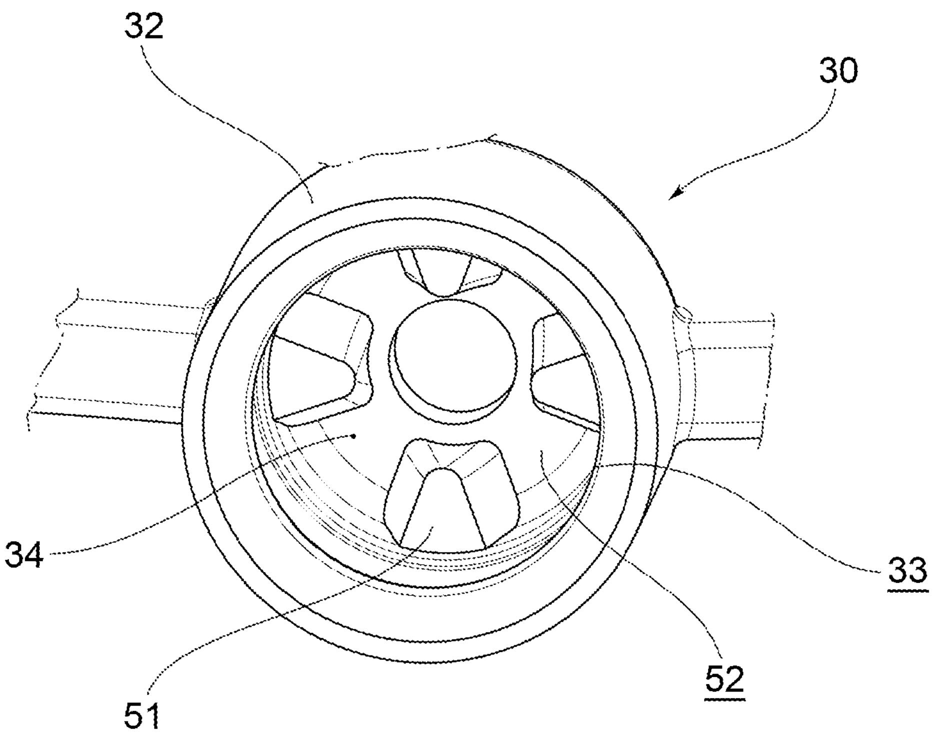
FIGS. 3A and 3B show an enlargement of FIGS. 2A and 2B, in particular the engagement zone between the vial closing element (FIG. 3A) and the vial opening lever (FIG. 3B)
Figure 3A:
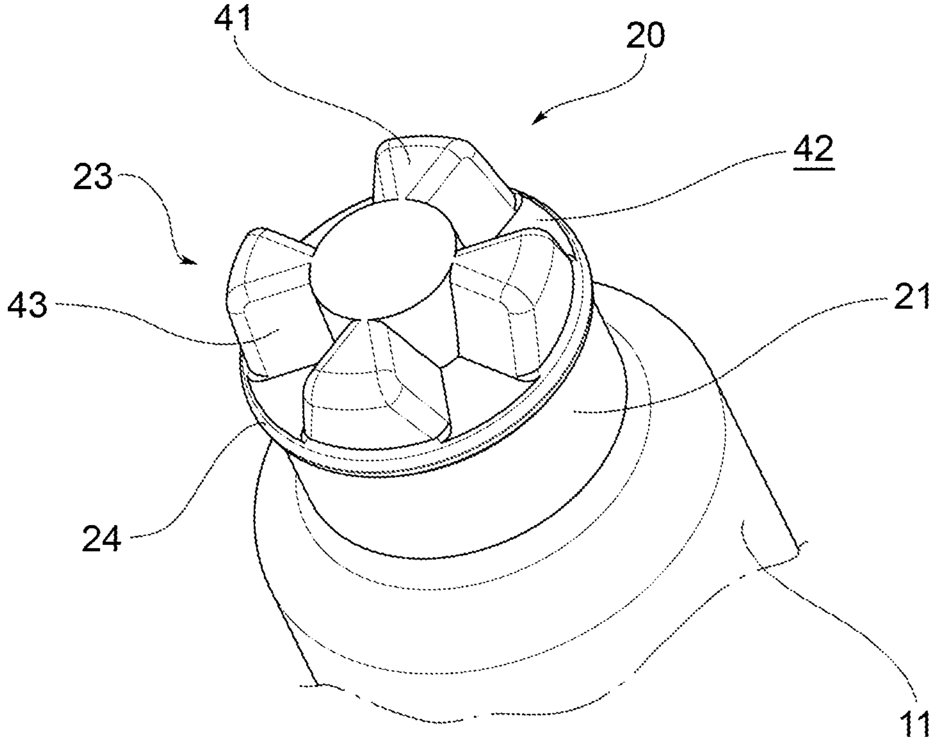

With reference to the accompanying drawings, reference numeral 1 shows a vial for packaging one or more doses of fluid, liquid, or pasty products, particularly for medical, pharmaceutical, cosmetic, food products or the like.

The term "fluid products" does not mean only liquid products but also viscous products, for example in the paste and gel state, and powdered products, in particular very fine powders with great flowability.

The vial 1 is made of polymer material, for example polyethylene or polypropylene, through forming techniques such as injection molding. In a different example, the vial 1 is made using the blowing technique which allows to obtain multilayer walls made of polymer materials (such as polyethylene and/or polypropylene) and/or barrier materials (LDPE, HDPE, LLDPE, EVOH).

The vial 1 in accordance with the present invention is of the disposable type, i.e., is not reclosable.

The vial 1 comprises a containment body 10, which is internally hollow, adapted to house a predetermined dose of product.

Preferably, the containment body 10 is provided with a pair of flaps 14 adapted to facilitate gripping of the vial 1 by a user. The flaps 14 extend, diametrically opposite to each other, from the outer lateral surface of the containment body 10.

It should be noted that the vial 1 can be produced in single units or in series to form a strip, as shown in FIG. 1. In the latter case, each flap 14 is associated, removably by means of a weakened zone 15, with a flap 14 of one or more adjacent vials, so as to form a monolithic strip, i.e., in a single piece. The weakened zones 15 are easily tearable by the user to separate one vial from the other.

The containment body 10, of substantially tubular and elongated shape, extends along a longitudinal axis X and has an end provided with a neck 11, at the top of which a product dispensing mouth 12 is defined.

The opposite end of the containment body 10 is provided with an opening adapted to introduce the product, which is closed after filling (for example by welding) to form a bottom 13.

The vial 1 comprises a closing element 20 for the occlusion of the dispensing mouth 12, removably associated with the containment body 10 at the neck 11.

The closing element 20 is made in a monolithic body together with the containment body 10 and, in an initial configuration, is joined thereto along a predetermined breaking line 22. In other words, the containment body 10 and the closing element 20 are made in a single monolithic piece so that the dispensing mouth 12 of the vial 1 is initially closed and can be opened by tearing off the closing element 20. The closing element 20 is detachable from the containment body 10 in an opening configuration in which on the containment body 10, at the predetermined breaking line 22, the dispensing mouth 12 through which the fluid product can be dispensed is formed.

The closing element 20, preferably cylindrical in shape, comprises a lower portion 21 joined to the containment body 10 by the predetermined breaking line 22, and an upper portion 23 which is prismatically associable with an opening key 30 for removal of the closing element 20 from the containment body 10.

The vial 1 comprises an opening key 30 which allows gripping and rotation of the closing element 20 thereon with respect to the containment body 10, so as to tear the predetermined breaking zone 22.

The opening key 30 comprises a gripping portion 31 and a portion 32 for connection with the closing element 20.

The gripping portion 31 is substantially plate-like to facilitate the gripping and rotation thereof.

The connecting portion 32, preferably cylindrical in shape, comprises an inner seat 33, also preferably cylindrical in shape, in which the closing element 20 is at least partially inserted.

In a constructional variant shown in FIGS. 1 to 5, the tubular connecting portion 32 ends at the closing element 20, i.e., before the predetermined breaking zone 22 and the beginning of the neck 11.

Figure 6B:
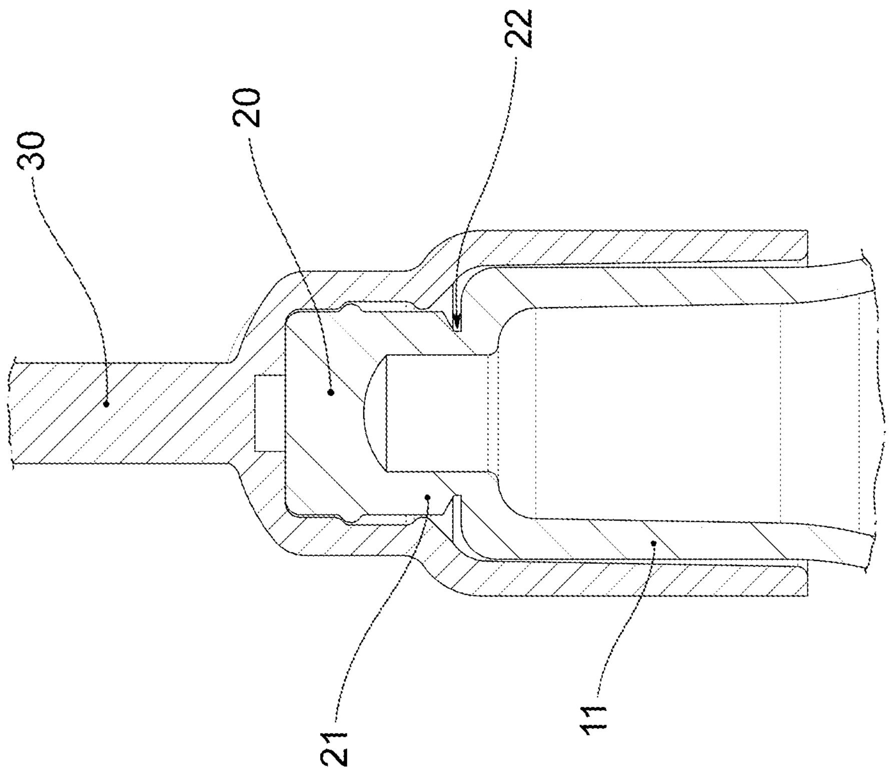
FIGS. 6A and 6B show a sectional view of a vial in accordance with the present invention in a further constructional variant, in a safety configuration of the childproof lever (FIG. 6A) and in a lever operation configuration for opening the vial (FIG. 6B)
Figure 6A:
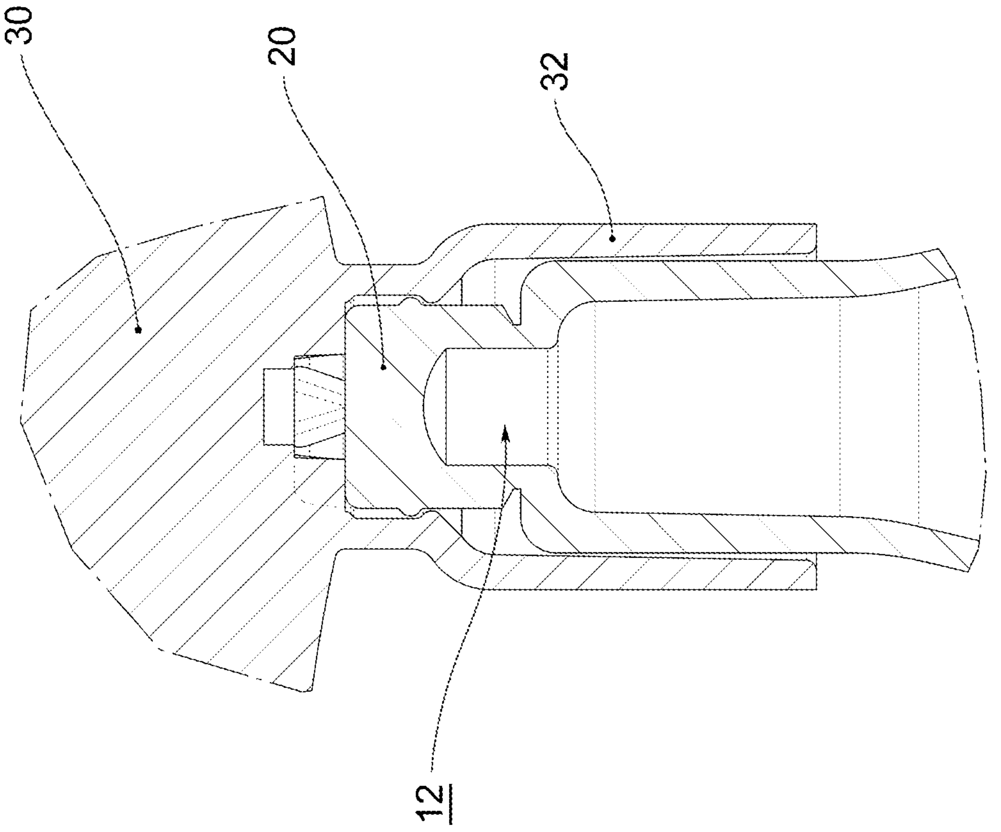
Figure 7:
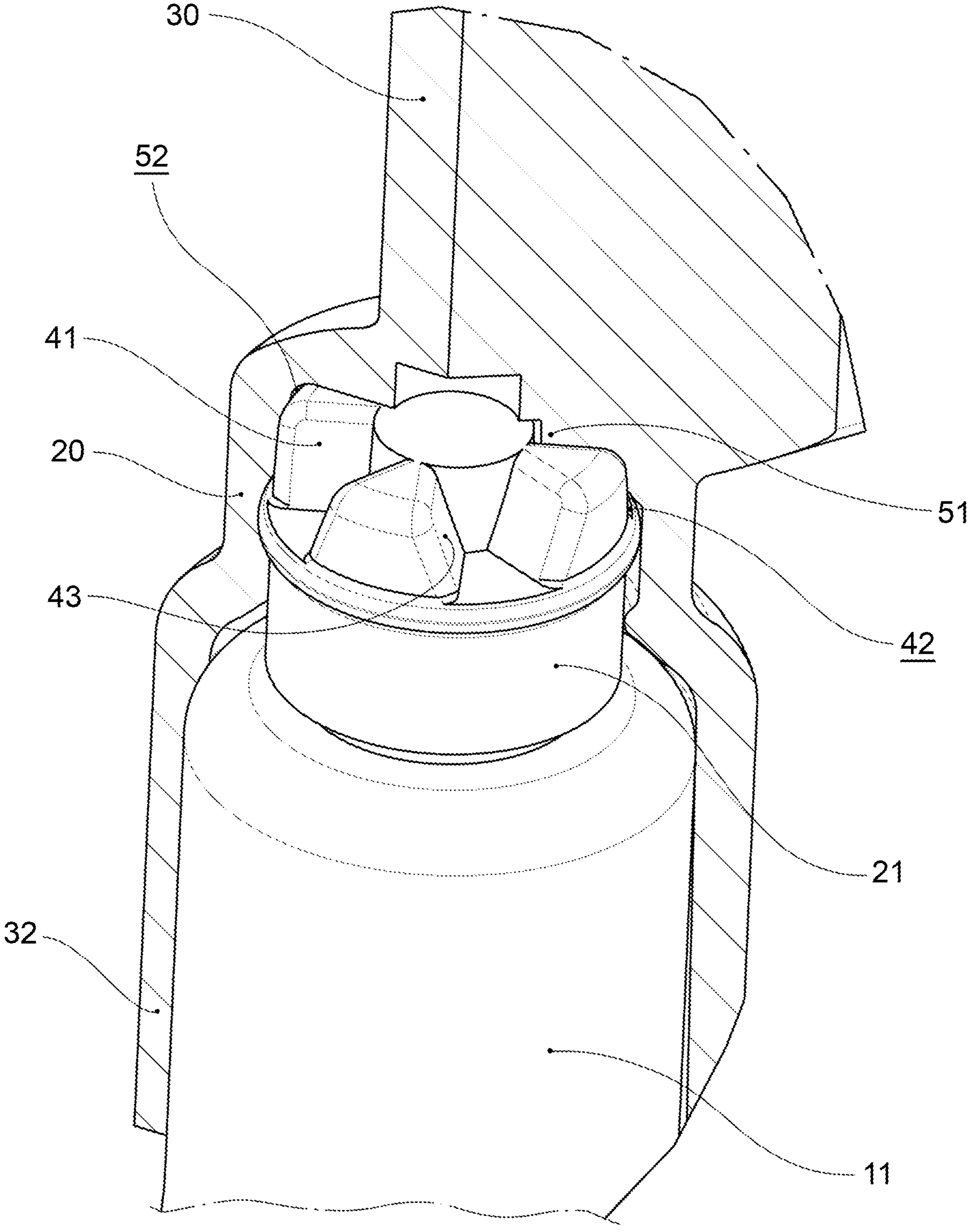
FIG. 7 shows a sectional axonometric view of the vial in FIG. 6B.

In a further constructional variant shown in FIGS. 6 to 7, the connecting portion 32 is elongated and extends beyond the closing element 20, at least to cover the predetermined breaking line 22, preferably until it at least partially covers the neck 11. Such a technical solution helps to keep the opening key 30 in place on the containment body 10 in the initial configuration (FIG. 6*a*). Furthermore, the fact that the connecting portion 32 extends at least to cover the predetermined breaking line 22, avoids involuntary and unwanted tearing of the predetermined breaking zone before actual use of the fluid product, even in the event of accidental and involuntary impacts, thereby improving the integrity of the product.

Figure 4B:
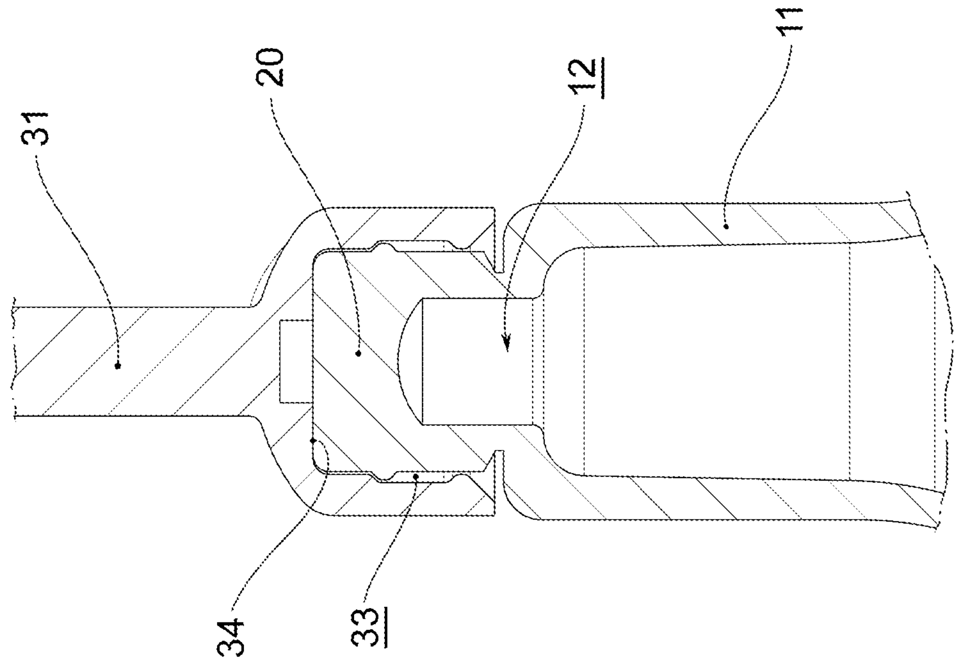
FIGS. 4A and 4B show a sectional view of one of the vials in FIG. 1, in a safety configuration of the childproof lever (FIG. 4A) and in a lever operation configuration for opening the vial (FIG. 4B)
Figure 4A:
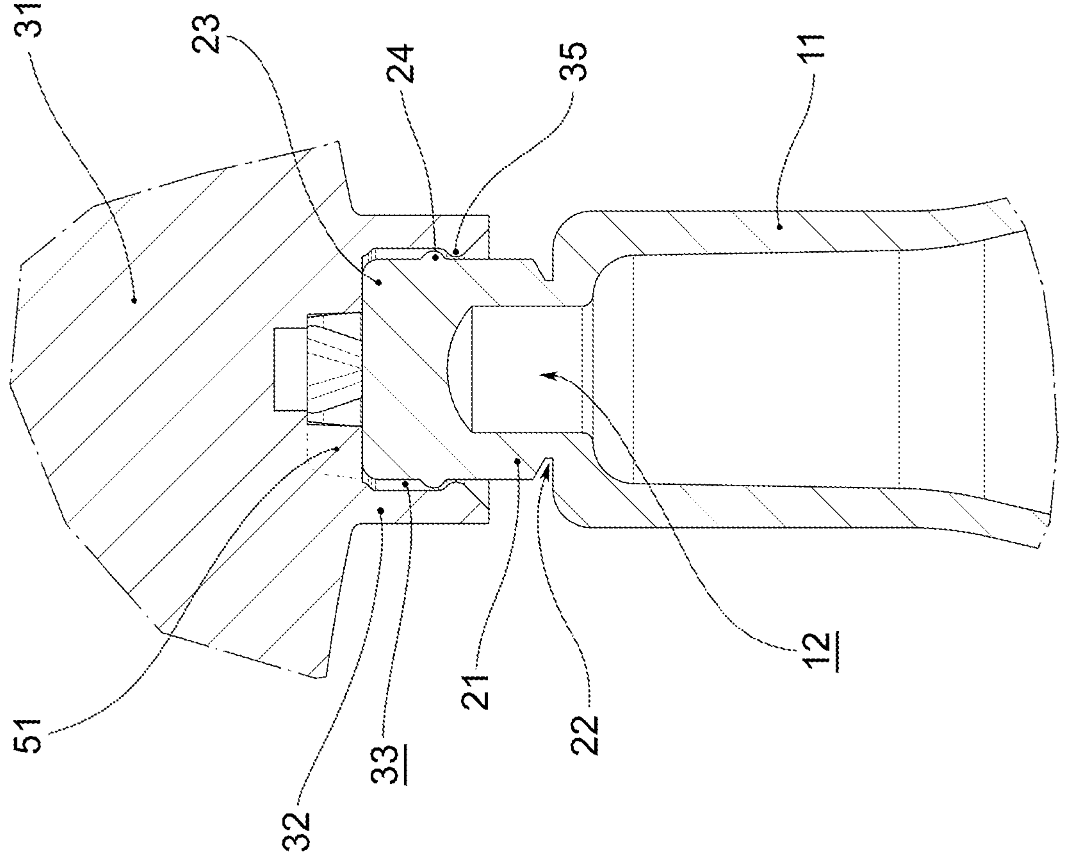
Figure 5:
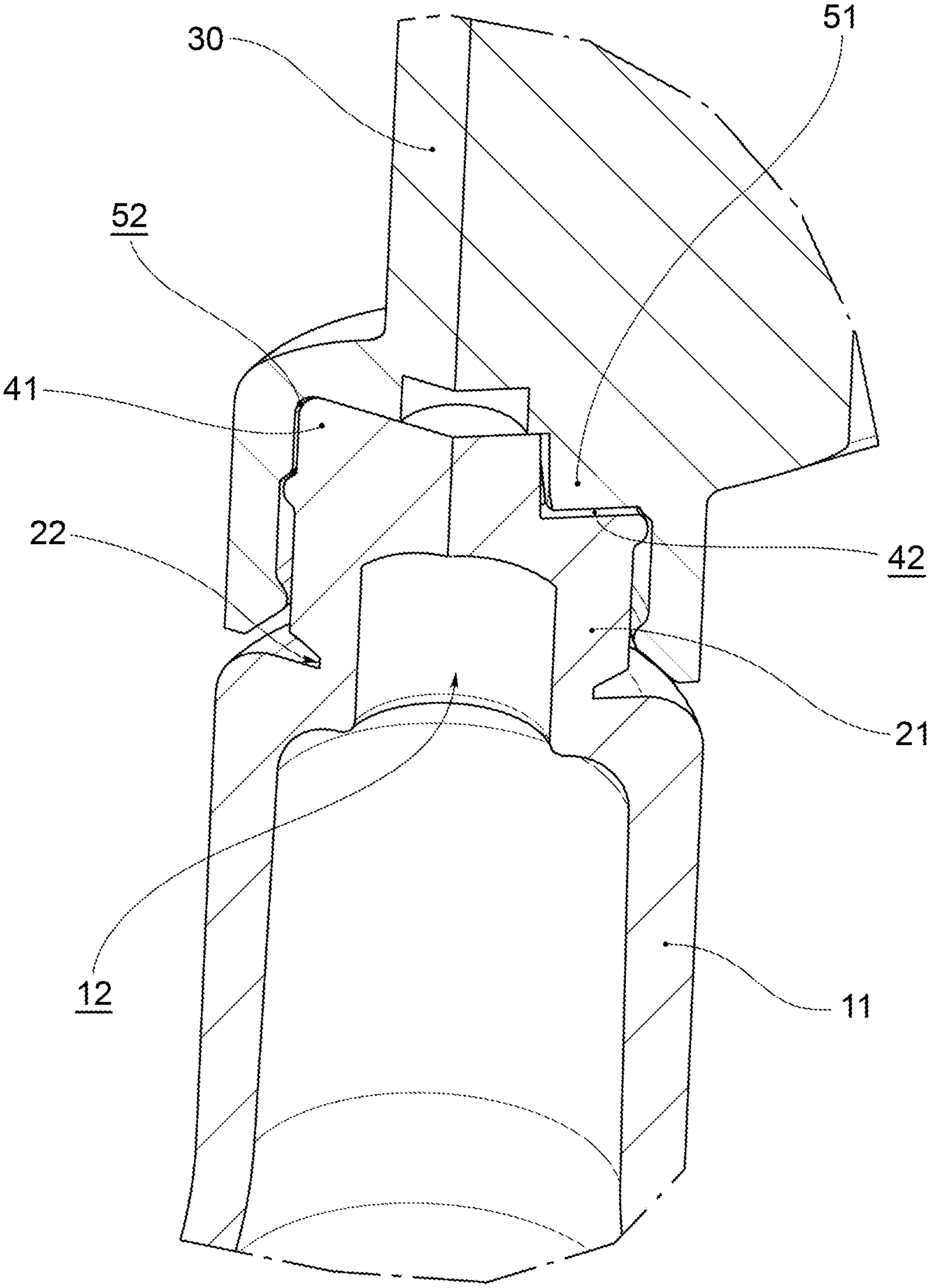
FIG. 5 shows a sectional axonometric view of one of the vials in FIG. 1, in the lever operation configuration for opening the vial (as in FIG. 4B)

The opening key 30 is made separately from the containment body 10, and in the initial configuration shown in FIGS. 1 and 4*a*, it is already coupled to the closing element 20 by an axial constraint which allows the opening key 30 to rotate freely around the closing element 20 without being axially removed therefrom.

As shown in the detail in FIG. 4*a*, the closing element 20 comprises an axial constraint 24, for example a radial ring protruding externally between the lower portion 21 and the upper portion 23 of the closing element 20. The opening key 30 comprises a corresponding axial constraint 35, for example a radial ring protruding inside the seat 33 of the lower portion 21. In the coupling configuration shown in FIG. 4*b*, the opening key 30 is prismatically associated with the closing element 20 to leverage thereon and tear it off from the containment body 10 and obtain the opening configuration of the vial 1.

Therefore, the opening key 30 comprises a prismatic coupling seat 33 and the closing element 20 has an upper portion 23 substantially matching the prismatic coupling seat 33.

The seat 33 of the opening key 30 is configured to rotationally constrain the closing element 20 about the axis X.

In this regard, the upper portion 23 of the closing element 20 comprises at least one pair of prismatic protrusions 41 between which a pair of recesses 42 is defined. Similarly, the seat 33 of the opening key 30 comprises at least one pair of prismatic protrusions 51 between which a pair of recesses 52 is defined.

The prismatic protrusions 41 are insertable into the corresponding recesses 52 of the opening key 30, and the prismatic protrusions 51 are insertable into the corresponding recesses 42 of the closing element 20.

The opening key 30 is slidingly movable with respect to the containment body 10 between an initial configuration, in which the prismatic protrusions 41, 51 are released from each other, and a coupling configuration, in which the prismatic coupling is obtained with the closing element 20.

In particular, in the initial configuration (FIG. 4*a*), the prismatic protrusions 41, 51 are vertically aligned with each other, abutting one above the other. In the coupling configuration (FIG. 4*b*), the prismatic protrusions 41, 51 are mutually intersected, in lateral abutment one against the other.

Preferably, there are four prismatic protrusions 41,51.

Preferably, the prismatic protrusions 41,51 are flared, i.e., they widen at the base so that the respective recesses 42,52 narrow at the base.

Preferably, the prismatic protrusions 41,51 are substantially triangular with the apex of the triangle facing the center.

Preferably, the prismatic protrusions 41 of the closing element 20 are beveled and rounded to easily slide out of the respective recesses 52 of the opening key 30.

The prismatic protrusions 41 of the closing element 20 define abutment surfaces 43 arranged transversely to the axis X and against which the prismatic protrusions 51 of the opening key 30 rest upon the displacement thereof approaching the containment body 10. Preferably, the abutment surfaces 43 of the prismatic protrusions 41 have a slightly helical extension in order to easily slide out of the respective recesses 52 of the opening key 30.

Therefore, the opening key 30 has the recesses 52 at the bottom 34 of the seat 33, in which the protrusions 41 of the closing element 20 are inserted upon the displacement of the opening key 30 from the initial or rest position to the coupling or working position.

It should be noted that the bottom 34 of the seat 33 defines the end-stroke position of the opening key 30 approaching the containment body 10.

As mentioned above, the opening key 30, in the initial configuration shown in FIGS. 1 and 4*a*, is already connected to the closing element 20 by an axial constraint which allows the opening key 30 to freely rotate around the closing element 20 (without prismatic coupling) but without being axially removed therefrom.

Only in the coupling configuration, in which the opening key 30 is pushed towards the containment body 10, the prismatic protrusions 51 are able to rotate the prismatic protrusions 41 along with the entire closing element 20 about the axis X.

Therefore, to open each vial 1 it is necessary to push the opening key 30 downwards so as to achieve a prismatic coupling between the prismatic protrusions 41 of the closing element and the prismatic protrusions 51 of the opening key 30. The opening key 30 reaches the working position when the prismatic protrusions 41 of the closing element 20 rest against the bottom wall 34. Only at this point, the closing element 20 is rotationally integral with the opening key 30 about the axis X.

Advantageously, the particular configuration of the prismatic protrusions 41,51 facilitates the prismatic decoupling between the opening key 30 and the closing element 20 in the absence of a downward pressure force, making the vial 1 childproof.

It is thus necessary to maintain a downward pressure force and simultaneously rotate the opening key 30 about the longitudinal axis of the vial 1 to tear the predetermined breaking zone 22, thus obtaining the separation of the closing element 20 from the containment body 10, allowing the fluid product to come out. Therefore, a combined action (pushing plus rotation) is required to obtain the opening of the vial. Such a need configures the vial as having a “childproof” closure.

Advantageously, moreover, by virtue of the presence of the axial constraint 24, 35 between the opening key 30 and the closing element 20, the latter remains inserted into the seat 33 even after removal from the containment body 10, preventing small pieces from being accidentally ingested for example by a child.

Advantageously, moreover, in the case of a strip as shown in FIG. 1, the prismatic protrusions 41,51 are oriented so as to keep the closing element 20 and the opening key 30 in the “not engaged” configuration, making it impossible to open the vial if it is not first separated from the rest of the strip.

Therefore, the present invention relates to a vial 1 for fluid products, particularly pharmaceutical, cosmetic, medical products or the like, comprising:

a containment body 10 for a fluid product, provided with a product dispensing mouth 12;

a closing element 20 which:

in an initial configuration, is joined to the containment body 10 along a predetermined breaking line 22 to close the dispensing mouth 12 and, in an opening configuration, obtained by tearing the predetermined breaking line 22, is separated from the containment body 10 to open the dispensing mouth 12;

an opening key 30 which:

in the initial configuration, is slidingly fitted on the closing element 20 and rotationally released from the closing element 20, and in a working configuration, is prismatically rotationally engaged with the closing element 20 to leverage thereon and remove it from the containment body 10 to obtain the opening configuration.

In particular, the closing element 20 comprises an upper portion 23 provided with prismatic protrusions 41 interspersed with recesses 42, and the opening key 30 comprises a prismatic coupling seat 33 with a bottom 34 provided with prismatic protrusions 51 interspersed with recesses 52, and in the working configuration the prismatic protrusions 41 of the closing element 20 are inserted into the recesses 52 of the opening key 30.

The present invention also relates to a monolithic strip of vials for fluid products, particularly pharmaceutical, cosmetic, medical products or the like, comprising a plurality of vials 1 in which each flap 14 is removably associated by a weakened zone 15 with a flap 14 of one or more adjacent vials. Preferably, the strip comprises five vials 1, as shown in FIG. 1.

Innovatively, a vial in accordance with the present invention has a childproof opening system.

Advantageously, a vial in accordance with the present invention allows to overcome the drawbacks of the known vials in a simple and rational manner, being easy and effective to use and at a low cost.

It is apparent that those skilled in the art could make changes to the product described above, all contained within the scope of protection as described and claimed herein.

The invention claimed is:

1. A vial for fluid products comprising one of a pharmaceutical, a cosmetic, and a medical product, the vial comprising:

a containment body provided with a dispensing mouth;

a closing element that:

in an initial configuration is joined to the containment body along a predetermined breaking line to close the dispensing mouth, and in an opening configuration, obtained by tearing the predetermined breaking line, is separated from the containment body to open the dispensing mouth; and an opening key that:

in the initial configuration is slidingly fitted onto the closing element and rotationally released from the closing element, and in a working configuration is prismatically rotationally engaged with the closing element to put pressure on the closing element and remove the closing element from the containment body to obtain the opening configuration;

wherein the closing element comprises an upper portion provided with prismatic protrusions interspersed with recesses, a central cylindrical element provided among the prismatic protrusions, and the opening key comprises a prismatic coupling seat with a bottom provided with prismatic protrusions interspersed with recesses, wherein in the working configuration the prismatic protrusions of the closing element are inserted into the recesses of the opening key, and wherein, the prismatic protrusions of the closing element and of the opening key are flared and widen at a base so that respective recesses narrow at the base.

2. The vial of claim 1, wherein there are four of said prismatic protrusions.

3. The vial of claim 1, wherein the prismatic protrusions of the closing element and of the opening key are substantially triangular with the apex of the triangle facing the center.

4. The vial of claim 1, wherein the prismatic protrusions of the closing element are beveled and rounded.

5. The vial of claim 1, wherein the prismatic protrusions of the closing element define transverse abutment surfaces having a helical extension.

6. The vial of claim 1, wherein the opening key comprises a gripping portion and a connecting portion extending below the gripping portion, the closing element being inserted in the connecting portion, and wherein the connecting portion extends at least to cover the predetermined breaking line.

7. The vial of claim 1, wherein in the initial configuration, the opening key is axially constrained to the closing element by at least one axial constraint.

8. The vial of claim 1, further comprising a pair of flaps protruding from an outer lateral surface of the containment body.

9. A strip of vials for fluid products, the fluid products comprising one of a pharmaceutical product, a cosmetic product, and a medical product, the strip of vials comprising: a plurality of vials according to claim 8, wherein each flap is removably associated by a weakened zone with a flap of one or more adjacent vials.

10. The vial of claim 1, wherein each of the prismatic protrusions are symmetrical.

11. The vial of claim 1, wherein each of the prismatic protrusions have walls inclined on two sides.

* * * * *